United States Patent
Olives et al.

(10) Patent No.: US 8,671,004 B2
(45) Date of Patent: Mar. 11, 2014

(54) SYSTEM AND METHOD OF PROVIDING SPENDING INFORMATION BY FOREIGN VISITORS USING TRANSACTION RECORDS OF FINANCIAL PRESENTATION DEVICES

(75) Inventors: Jeffrey Rolland Olives, Danville, CA (US); John Chivers, Fremont, CA (US); Laura Tallman DiGioacchino, San Mateo, CA (US); John W. Chandler, Sausalito, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 118 days.

(21) Appl. No.: 12/795,401

(22) Filed: Jun. 7, 2010

(65) Prior Publication Data
US 2011/0302061 A1 Dec. 8, 2011

(51) Int. Cl.
*G06Q 10/00* (2012.01)
*G06Q 30/00* (2012.01)
*G07B 17/00* (2006.01)
*G07F 19/00* (2006.01)

(52) U.S. Cl.
USPC ....... 705/7.11; 705/7.32; 705/7.33; 705/7.34; 705/7.36; 705/26.9; 705/30

(58) Field of Classification Search
USPC .................................................... 705/24–30
See application file for complete search history.

(56) References Cited

U.S. PATENT DOCUMENTS

| | | | |
|---|---|---|---|
| 7,765,136 B2 * | 7/2010 | Northington et al. | 705/35 |
| 7,949,600 B1 * | 5/2011 | Portillo et al. | 705/39 |
| 2003/0061358 A1 * | 3/2003 | Piazza et al. | 709/227 |
| 2003/0208440 A1 * | 11/2003 | Harada et al. | 705/39 |

* cited by examiner

*Primary Examiner* — Ig T An
(74) *Attorney, Agent, or Firm* — Loeb & Loeb LLP (57) ABSTRACT

A system for providing spending information in a locality by foreign visitors using transaction records of financial presentation devices such as credit and debit cards that are presentable to merchants is disclosed. A storage device stores transaction data generated from card transactions. A transaction analysis module executable by a processor generates a filtered set of transaction records that exclude, from the stored data, a set of transactions which are indicative of having been made by long term residents of the locality, rather than by residents of foreign regions, in order to improve the accuracy of true foreign visitors to the locality. For example, the system filters out from the database all transactions of accounts that have made a bill-pay transaction. As another example, the system filters out non face-to-face transactions and all transactions with mail order and catalog merchants, and schools. Based on the filtered data, the transaction analysis module generates a spending report containing an aggregated amount of the transactions for each foreign region of the holders who have performed the transactions in the locality.

30 Claims, 8 Drawing Sheets

FIG. 1

State Summary by Originating Country
3RD QTR 2009

XYZ Dept. of Tourism

| Consumer | | | 3RD QTR 2009 | | | |
|---|---|---|---|---|---|---|
| Originating Country | Cardholder Count | Total Spend Amount | Transaction Count | Avg. Ticket | Trans / Cardholder | Cash Amount |
| ... | ... | ... | ... | ... | ... | ... |
| TAIWAN | 1,362 | $895,777 | 4,786 | $187.17 | 3.5 | $30,280 |
| TAJIKISTAN | <10 | $1,688 | 49 | $34.45 | 8.2 | $11,419 |
| THAILAND | 678 | $418,903 | 2,610 | $160.50 | 3.8 | $484,667 |
| TONGA | <10 | $487 | 2 | $243.65 | 2.0 | $4,595 |
| TRINIDAD AND TOBAGO | 7,801 | $13,292,857 | 61,008 | $217.89 | 7.8 | $1,213,464 |
| TUNISIA | 20 | $17,565 | 100 | $175.65 | 5.0 | $7,917 |
| TURKEY | 2,136 | $2,496,238 | 19,542 | $127.74 | 9.1 | $313,946 |
| TURKMENISTAN | <10 | $13 | 1 | $12.72 | 1.0 | $0 |
| TURKS & CAICOS ISLANDS | 858 | $710,523 | 6,606 | $107.56 | 7.7 | $1,662,154 |
| U.S. VIRGIN ISLANDS | 156 | $75,411 | 820 | $91.96 | 5.3 | $8,421 |
| UGANDA | <10 | $5,300 | 37 | $143.25 | 4.1 | $4,356 |
| UKRAINE | 600 | $697,231 | 4,068 | $171.39 | 6.8 | $333,072 |
| UNITED ARAB EMIRATES | 1,857 | $2,601,148 | 10,474 | $248.34 | 5.6 | $462,145 |

| | | FROM FIG. 4A | | | |
|---|---|---|---|---|---|
| UNITED KINGDOM | 147,901 | 810,238 | $129.47 | 5.5 | $24,896,791 |
| UNITED REP. OF TANZANIA | 13 | 47 | $119.71 | 3.6 | $5,457 |
| URUGUAY | 3,812 | 22,554 | $149.30 | 5.9 | $236,012 |
| UZBEKISTAN | 12 | 70 | $362.19 | 5.8 | $23,336 |
| VATICAN CITY STATE | 21 | 40 | $195.29 | 1.9 | $907 |
| VENEZUELA | 43,303 | 348,730 | $105.53 | 8.1 | $2,937,320 |
| VIETNAM | 229 | 1,416 | $107.00 | 6.2 | $37,556 |
| YEMEN ARAB REPUBLIC | <10 | 49 | $287.24 | 7.0 | $0 |
| ZAMBIA | 16 | 147 | $103.09 | 9.2 | $42,399 |
| ZIMBABWE | <10 | 26 | $145.87 | 6.5 | $0 |
| | | | | | |
| Total | 1,026,821 | 6,437,805 | $139.34 | 6.3 | $130,126,106 |

F I G. 4B

State Market Segment Summary by Originating Country      XYZ Dept. of Tourism
3RD QTR 2009

Consumer 502

| | | 3RD QTR 2009 | | | |
|---|---|---|---|---|---|
| Originating Country | Market Segment | Cardholder Count | Total Spend Amount | Transaction Count | Avg. Ticket | Trans./ Cardholder |
| ⋮ | ⋮ | ⋮ | ⋮ | ⋮ | ⋮ | ⋮ |
| AUSTRALIA | DRUG STORES & PHARMACIES | 599 | $35,028 | 841 | $41.65 | 1.4 |
| AUSTRALIA | FURNITURE/EQUIP STORES | 17 | $12,183 | 20 | $609.14 | 1.2 |
| AUSTRALIA | GOVERNMENT | 34 | $1,188 | 38 | $31.27 | 1.1 |
| AUSTRALIA | HEALTH CARE | 215 | $109,404 | 270 | $405.20 | 1.3 |
| AUSTRALIA | LODGING | 2,301 | $1,183,669 | 3,681 | $321.56 | 1.6 |
| AUSTRALIA | MISC. SPECIALTY RETAIL | 1,589 | $298,592 | 3,198 | $93.37 | 2.0 |
| AUSTRALIA | OIL | 625 | $33,986 | 1,168 | $29.10 | 1.9 |
| AUSTRALIA | OTHER EMERGING | 328 | $13,112 | 444 | $29.53 | 1.4 |
| AUSTRALIA | OTHER RETAIL | 4,056 | $1,200,993 | 9,948 | $120.73 | 2.5 |
| AUSTRALIA | OTHER TRAVEL & ENTERTAINMENT | 1,228 | $300,176 | 1,747 | $171.82 | 1.4 |
| AUSTRALIA | OSR'S | 687 | $24,270 | 1,378 | $17.61 | 2.0 |
| AUSTRALIA | RADIO TV & STEREO STORES | 267 | $80,794 | 323 | $250.14 | 2.0 |
| AUSTRALIA | REMAINING MERCHANTS | 356 | $181,084 | 509 | $355.76 | 1.2 |

| | | | | | |
|---|---|---|---|---|---|
| AUSTRALIA | RESTAURANTS | 2,115 | $309,404 | 4,955 | $42.44 | 2.3 |
| AUSTRALIA | SPORTING GOODS STORES | 406 | $71,541 | 496 | $144.24 | 1.2 |
| AUSTRALIA | STEAMSHIP/CRUISE LINES | 2,450 | $3,283,026 | 3,000 | $1,094.34 | 1.2 |
| AUSTRALIA | SUPERMARKETS | 1,203 | $173,995 | 2,531 | $68.75 | 2.1 |
| AUSTRALIA | TRAVEL AGENCIES | 62 | $39,539 | 81 | $488.13 | 1.3 |
| AUSTRALIA | WHOLESALE CLUBS | 10 | $931 | 12 | $77.59 | 1.2 |
| AUSTRALIA | Total | | $7,982,182 | 37,324 | $213.86 | |
| AUSTRIA | AUTO RENTAL | 572 | $160,151 | 636 | $251.81 | 1.1 |
| AUSTRIA | BILL PAY | 29 | $6,898 | 43 | $160.43 | 1.5 |
| ⋮ | ⋮ | ⋮ | ⋮ | ⋮ | ⋮ | 1.2 |

FROM FIG. 5A

F I G. 5B

State Merchant Category Summary by Originating Country    XYZ Dept. of Tourism
3RD QTR 2009

Consumer

600

| Originating Country | Market Segment | Merchant Category | 3RD QTR 2009 ||||| 
|---|---|---|---|---|---|---|---|
| | | | Cardholder Count | Total Spend Amount | Transaction Count | Avg. Ticket | Trans./ Cardholder |
| ⋮ | ⋮ | ⋮ | ⋮ | ⋮ | ⋮ | ⋮ | ⋮ |
| AUSTRALIA | DRUG STORES & PHARMACIES | DRUG STORES & PHARMACIES | 599 | $35,028 | 841 | $41.65 | 1.4 |
| AUSTRALIA | FURNITURE/EQUIP STORES | FURNITURE/EQUIP STORES | 17 | $12,183 | 20 | $609.14 | 1.2 |
| AUSTRALIA | GOVERNMENT | GOV'T SERV.- DEFAULT | 34 | $1,188 | 38 | $31.27 | 1.1 |
| AUSTRALIA | HEALTH CARE | CHIROPRACTORS | <10 | $340 | 7 | $48.57 | 1.4 |
| AUSTRALIA | HEALTH CARE | COUNSELING SERVICE - ALL | <10 | $850 | 5 | $170.00 | 2.5 |
| AUSTRALIA | HEALTH CARE | DENTISTS/ ORTODONTISTS | 23 | $8,761 | 28 | $312.88 | 1.2 |
| AUSTRALIA | HEALTH CARE | DOCTORS & PHYSICIANS | 48 | $26,691 | 55 | $485.29 | 1.1 |
| AUSTRALIA | HEALTH CARE | HOSPITALS | <10 | $3,459 | 11 | $314.45 | 1.4 |
| AUSTRALIA | HEALTH CARE | VETERINARY SERVICES | 11 | $29,969 | 23 | $1,303.01 | 2.1 |

| | | FROM FIG. 6B | | | |
|---|---|---|---|---|---|
| ... | ... | ... | ... | ... | ... |
| AUSTRALIA | RESTAURANTS | 2,115 | $309,404 | 4,955 | $62.44 | 2.3 |
| AUSTRALIA | SPORTING GOODS STORES | 406 | $71,541 | 496 | $144.24 | 1.2 |
| AUSTRALIA | STEAMSHIP/ CRUISE LINE | 2,450 | $3,283,026 | 3,000 | $1,094.34 | 1.2 |
| AUSTRALIA | SUPERMARKETS | 1,203 | $173,995 | 2,531 | $68.75 | 2.1 |
| AUSTRALIA | TRAVEL AGENCIES | 62 | $39,539 | 81 | $488.13 | 1.3 |
| AUSTRALIA | WHOLESALE CLUBS | 10 | $931 | 12 | $77.59 | 1.2 |
| AUSTRALIA | Total | | $7,982,182 | 37,324 | $213.86 | |
| ... | ... | ... | ... | ... | ... |
| AUSTRIA | AUTO RENTAL | 572 | $160,151 | 636 | $251.81 | 1.1 |
| ... | ... | ... | ... | ... | ... |
| AUSTRIA | WHOLESALE CLUBS | <10 | $116 | 1 | $116.42 | 1.0 |
| AUSTRIA | Total | | $3,383,572 | 34,888 | $96.98 | |
| ... | ... | ... | ... | ... | ... |

SYSTEM AND METHOD OF PROVIDING SPENDING INFORMATION BY FOREIGN VISITORS USING TRANSACTION RECORDS OF FINANCIAL PRESENTATION DEVICES

FIELD OF THE INVENTION

The present invention relates to data processing systems, and more particularly to a system and method of providing spending information of foreign visitors by using transaction records of financial presentation devices such as debit and credit cards that are presentable to merchants.

BACKGROUND OF THE INVENTION

Tourism is one of the world's biggest industries, and localities that host tourist destinations rely on tourism to provide revenue and employment. Such localities typically encourage and bolster tourism through advertisements and promotions. As most tourist traffic comes from foreign visitors (e.g., visitors who are residents of another country or residents of another state), advertisements and promotions targeting foreign visitors are challenging due to the potentially large number of target countries and states.

To target their advertising in an optimal manner, tourism agencies and associated travel bureaus rely on federal government statistics to determine, by percentage or otherwise, which countries or states the foreign visitors are coming from. Currently available federal statistics are not accurate because they are based on interviews, typically done at an airport, of a limited number of visitors. For example, a government report for the locality of Florida estimates foreign visitors from foreign countries at 4.1 million based on based on 3,000 interviews. A more accurate count is probably close to 5.6 million visitors.

Furthermore, mere knowledge of the number of foreign visitors is often not sufficient without further information as to their spending habits.

Therefore, it would be desirable to provide accurate and detailed spending information by foreign visitors within a locality in a rapid and convenient manner to gain a better understanding of how to efficiently apply advertisement and promotional resources for the locality.

SUMMARY OF THE DISCLOSURE

In a first aspect, the present invention provides a system for providing spending information in a locality by foreign visitors using transaction records of financial presentation devices (FPDs) such as credit and debit cards that are presentable to merchants. A storage device stores records of transactions performed with FPDs that were issued in a foreign region such as a foreign country. A transaction analysis module executable by the processor generates a filtered set of transaction records that exclude, from the stored records, transactions that are more likely to have been made by long term residents, rather than by visitors to the locality in order to improve the accuracy of true foreign visitors to the locality. Based on the filtered set of transaction records, the transaction analysis module generates a spending report containing an aggregated amount of the transactions for each foreign region of the holders who have performed the FPD transactions in the locality.

For example, the filtered set of transaction records is generated by the transaction analysis module by identifying bill-pay transactions in the database and excluding records of all transactions by the FPDs that performed the identified bill-pay transactions. As another example, the filtered set of transaction records is generated by the transaction analysis module by excluding records of transactions that are not face-to-face transactions such as e-commerce transactions.

In another aspect, the present invention provides a method of providing spending information in a locality by foreign visitors using transaction records of FPDs that are presentable to merchants. The method is executed by a processor under the control of the transaction analysis module. The method involves determining a filtered set of transaction records that exclude, from the stored records, transactions that are more likely to have been made by long term residents, rather than by visitors to the locality in order to improve the accuracy of true foreign visitors to the locality. Based on the filtered set of transaction records, the method generates a spending report containing an aggregated amount of the transactions for each foreign region of the holders who have performed the FPD transactions in the locality.

DETAILED DESCRIPTION OF THE INVENTION

Certain terms are defined as follows to aid in the description of the invention(s) disclosed.

The term 'locality' as used herein is any geographical area for which foreign visitation information is being sought, including, but not limited to, a specific destination (e.g., Disney World, the Grand Canyon), a town, a city, a metropolitan statistical area (MSA), a region including one or more counties, a state, and a national region (e.g., mid-Atlantic states).

The word region is used herein as a country, a state/province (such as the state of New York) or an area within a country. A foreign visitor is a visitor who is a resident of a country which is different from the country that includes the locality. The foreign visitor, however, can be a resident of a state which is different from the state that includes the locality. Thus, a visitor from France to the state of New York can be a foreign visitor (i.e., a visitor to New York from the foreign country of France) and a visitor from the state of California to the state of New York can be a foreign visitor (i.e., a visitor to New York from the foreign state of California).

For clarity, the present invention will be explained in terms of a state (such as New York state) who is interested in spending habits of visitors from foreign countries. However, the present invention works with any locality and visitors to the locality from either states or countries.

A financial presentation device (FPD) is a device or financial instrument that can be presented to sellers of goods or services for payment, and includes, but are not limited to, credit cards, debit cards, prepaid cards, electronic benefit cards, charge cards, virtual cards, smart cards, key chain devices, personal digital assistants, cell phones, stored value devices and the like.

For clarity, some parts of the present invention will be explained in terms of credit cards that are presented to merchants for purchase of items. However, persons of ordinary skill in the art will appreciate that the present invention works with transaction records of any FPD type listed above.

Figure 1:
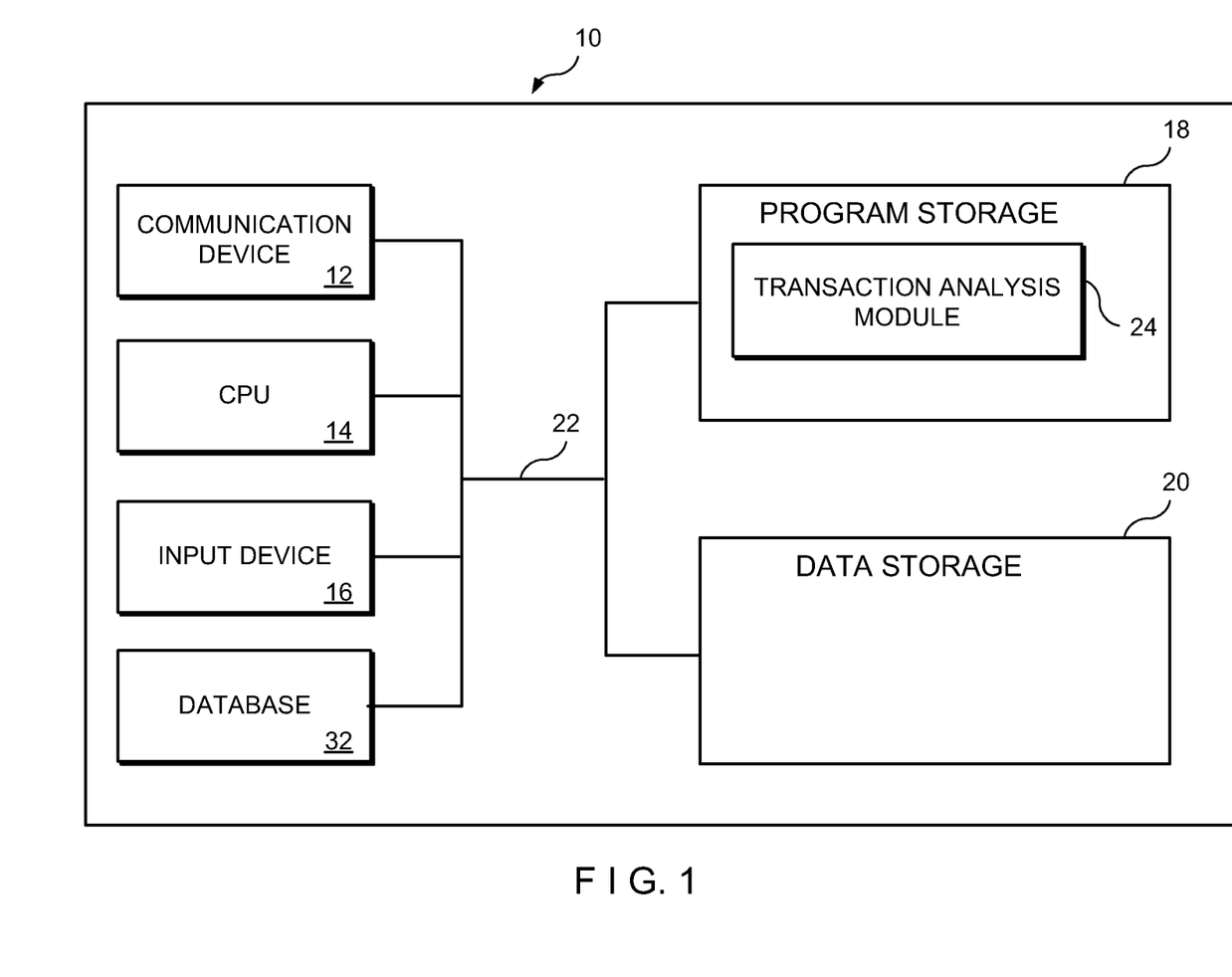
FIG. 1 is a block diagram of an exemplary system for providing spending information in a locality by foreign visitors using transaction records of financial presentation devices that are presentable to merchants according to an embodiment of the present invention.

For purposes of this application, the terms "code", "program", "application", "software code", "software module", "module" and "software program" are used interchangeably to mean software instructions that are executable by a processor FIG. 1 is a block diagram of an exemplary system 10 for generating various reports containing spending patterns of foreign visitors in a particular locality such as the state of New York. The system 10 includes a communication device 12 adapted for data communication using a plurality of communication modes and protocols. The communication device 12 receives information from and sends information to a financial transaction facilitator such as Visanet® that facilitates the processing of credit and debit card transactions between merchants and card issuers. The system 10 also includes a processor (CPU) 14, input device 16 for interacting with a user, database (storage device) 32, program storage 18, and data storage 20, all commonly connected to each other through a bus 22. The database 32 stores transaction records of credit card transactions that were made by cardholders. The database 32 can comprise an indexed data file or flat non-indexed file of transaction records or a combination of both. The program storage 18 stores, among other modules, a transaction analysis module 24 that analyzes transaction records and generates various types of reports containing spending patterns of foreign visitors in a particular locality based on transaction records of credit cards which will be more fully explained later herein with reference to FIG. 2. The transaction records stored in the database 32 may be transferred to the data storage 20 as needed for ready access by the processor 14.

It is to be appreciated that the system 10 may comprise any computer such as a personal computer, minicomputer, workstation or mainframe, or a combination thereof.

Figure 2:
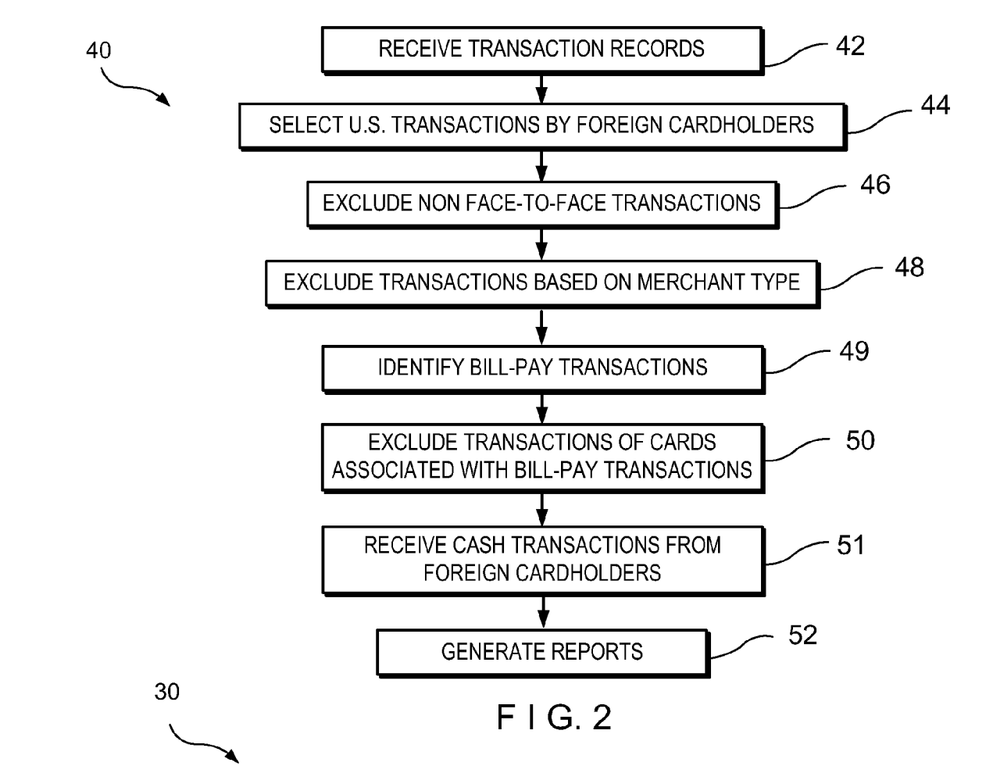
FIG. 2 is a flow chart of a method of providing spending information in a locality by foreign visitors using transaction records of financial presentation devices according to an embodiment of the present invention.
Figure 3:
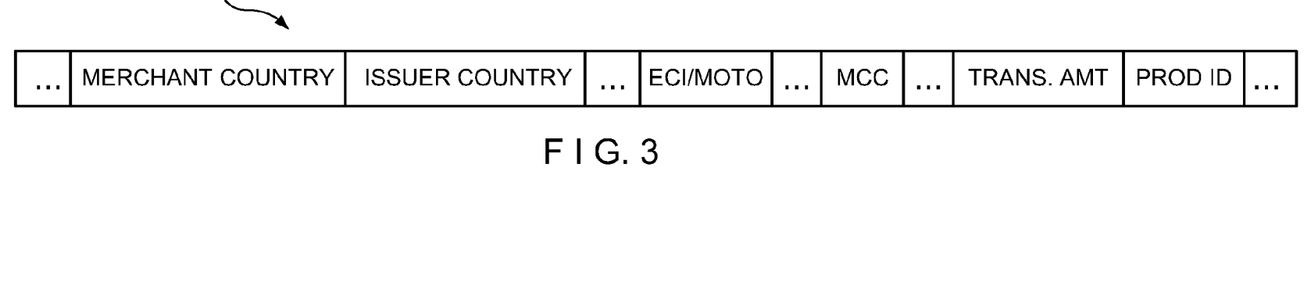
FIG. 3 illustrates an exemplary data structure of a transaction record used by the method of FIG. 2.

FIG. 2 is a flow chart of a method 40 of providing spending information in a locality by foreign visitors using credit card transaction records according to an embodiment of the present invention. The method 40 is performed by the transaction analysis module 24 in conjunction with the processor 14. In step 42, a transaction data file containing a set of credit card transaction records for all states of the U.S. within a predetermined time period (e.g., quarterly data) is received through the communication device 12 and stored in the database 32. A partial format of the transaction record is shown in FIG. 3 as element 30. In step 44, the method excludes or filters out from the database 32 all non-U.S. merchant transactions and all U.S. cardholder transactions. In other words, step 44 selects and retains only those transactions that have been made at U.S. merchants by non-U.S. cardholders (i.e., holders of cards issued by a financial institution in a foreign country).

It is assumed that the cardholders are citizens or long-term residents of the country in which their cards have been issued. Accordingly, the use of a foreign-issued card within a locality is taken as a proxy for a visitation in the locality by the holder of the foreign-issued credit card. This equivalence holds in the vast majority of cases so that the number of foreign visitors within a locality over a period can be determined based on the quantity of transactions performed with foreign-issued cards. It is noted that for the sake of privacy concerns that during data collection and reporting the identities of the cardholders are blocked out or otherwise made inaccessible at all times and only aggregated data is used.

Filtering can be accomplished in many different ways. One way is to remove from the database 32 all transactions being filtered out. Another way is to create a new database that holds only those transaction records that are not being filtered out.

One way to perform step 44 is to use a Merchant Country Code and Issuer Country Code fields in each transaction record 30. The Merchant Country Code is submitted in the sales transaction by a merchant or its acquirer. The Issuer Country Code is derived, based on the issuer's BIN (bank identification number) which is part of the credit card number. Step 44 then looks for transactions where the Merchant Country Code identifies the U.S. and where the Issuer Country Code identifies a country other than the U.S. All other transactions are filtered out.

As further filtering, if it has not been done previously, the method at step 44 selects only those transactions that were performed in one selected locality (e.g., state of Arizona) and filters out transactions that were performed in other states.

In step 46, the method excludes from the database 32 those transactions that are not face-to-face transactions (e.g., online transactions). Face-to-face transactions are transactions that are performed in person at the merchant location. One way to perform the exclusion is to use a field called "ECI/MOTO" (Electronic Commerce Indicator/Mail Or Telephone Order) in the transaction record 30. Step 46 excludes all transactions where the ECI/MOTO field identifies the transaction as an e-commerce (i.e., Internet) transaction or a telephone transaction.

Steps 48-50 are executed to generate a filtered set of transactions that exclude, from the stored records, a set of transactions which are indicative of having been made by long term residents of the locality as explained in more detail below.

In step 48, the method excludes from the database 32 certain transactions based on a merchant type/category which are more likely to have been made by long term residents rather than by visitors. Specifically, three types of merchants are in this category: 1) direct marketing merchants, 2) catalog merchants and) schools.

The direct marketing merchants typically offer their services via outbound telemarketing calls in which the merchant initiates direct contact with the consumer in an attempt to generate a sale. In all cases, these offerings are made in a card-not-present (CNP) environment and may include, but are not limited to, discount buying clubs, membership clubs, discount travel clubs, credit card protection/registration and protection services, cosmetics, health-care products and vitamins.

The catalog merchants offer their merchandise via catalogs, and accept merchandise orders from customers by mail, telephone or fax in a non-face-to-face manner.

The school merchants include elementary and secondary schools, and colleges. This category also includes merchants offering educational courses and services including music, drama, language, art, cooking, modeling, charm schools, automobile driving instruction and flying instruction.

Thus, in step 48, the method selects those transactions based on the above merchant types/categories and excludes them from the database 32. One way to implement this step is to use a merchant category identifier such as a merchant category code (MCC) in the transaction record 30 which specifies the type of merchant.

In step 49, the method determines or identifies "bill-pay" transactions. Bill-pay transactions are payment transactions that are made in response to recurring bills. Examples of bill-pay merchants include telecommunication service providers, pay TV service providers and utility service providers.

The telecommunication service providers include those that provide local and long distance telephone calls, calls placed through the use of magnetic-stripe-reading telephones, and fax services. These merchants typically provide "lump sum" periodic (e.g., monthly) billing of telephone calls. The pay TV service providers provide television programming on a subscription or fee basis and include cable TV service providers, and satellite TV and radio service providers. The utility service providers provide the generation, transmission and/or distribution of electric, or gas power, or other utility type services on an ongoing basis. They include merchants providing water supply system services and merchants primarily engaged in the collection and disposal of refuse.

The assumption being made is that any cardholder conducting a bill-pay transaction is likely to be a long term resident of the locality rather than a tourist. Accordingly, in step 50, the method excludes from the database 32 all transactions of the cards that were identified as having made the bill-pay transactions. One way to identify bill-pay transactions is to use the MCC in the transaction record 30 which specifies the type of merchant. Once the bill-pay transactions have been identified, card numbers of those transactions are stored in the data storage 20. Then for each card number stored, all transactions made with that card number are excluded or filtered out from the database 32.

In step 51, a transaction record data file containing a set of cash (automatic teller machine) transactions that were made in the locality by foreign cardholders are merged into the database 32 to include data regarding cash transactions as well as the credit card transactions.

In step 52, the method generates various reports based on the filtered transaction records in the database 32. For example, a report is generated that contains a list of foreign countries of origin of the cardholders who have performed the transactions in the locality using the credit cards along with the total, aggregated amount of the transactions for each of the listed foreign countries. However, it is to be understood that the present invention is not limited to the analysis of spending patterns of foreign country holders who have spent money in a locality. The principles of the present invention can be extended to analyzing the spending patterns of cardholders from other states (such as New York and New Jersey) in the locality of the state of California.

Figure 4A:
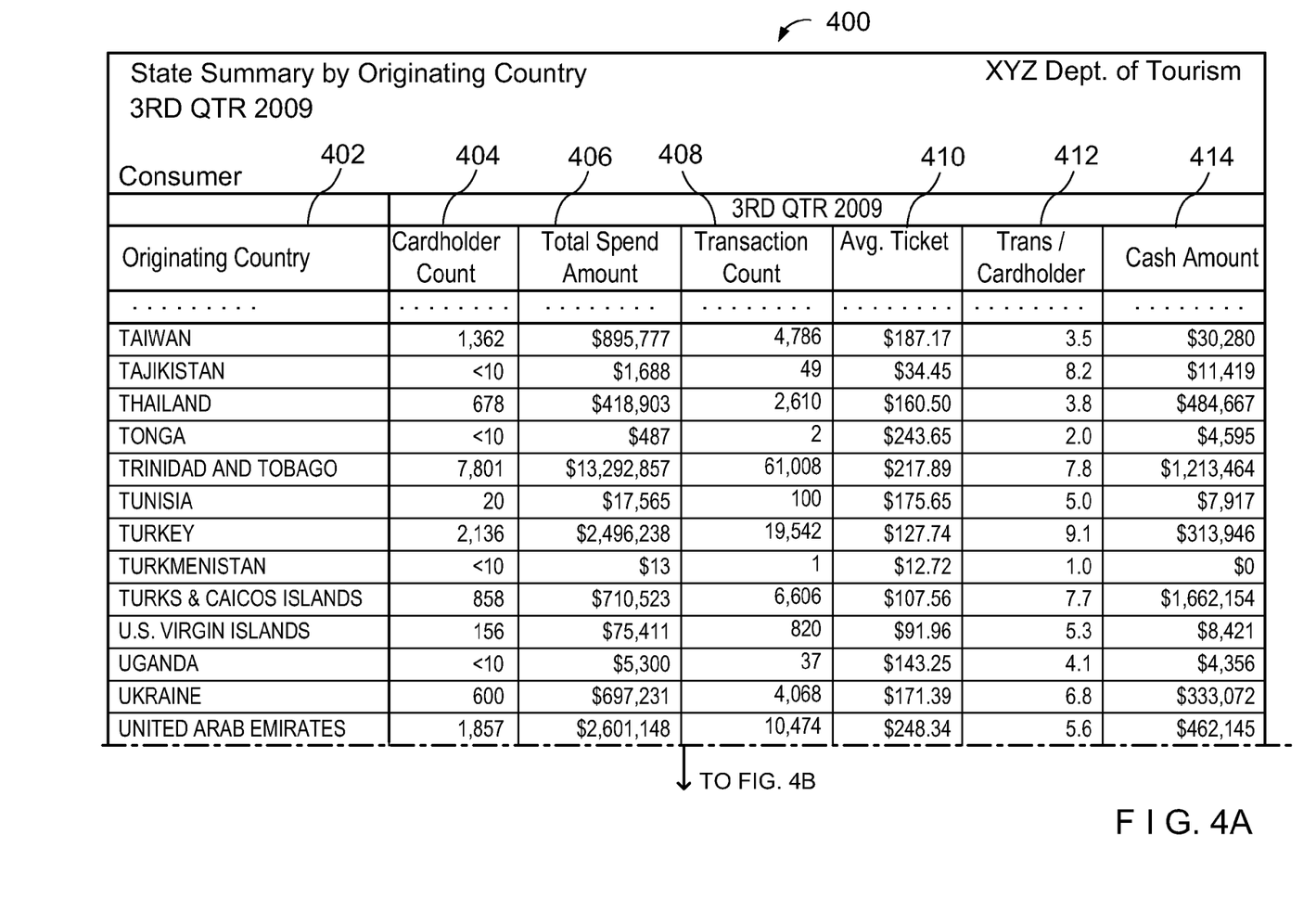
FIG. 4A and FIG. 4B are a portion of an exemplary report showing spending information of foreign visitors according to an embodiment of the present invention.
Figure 4B:
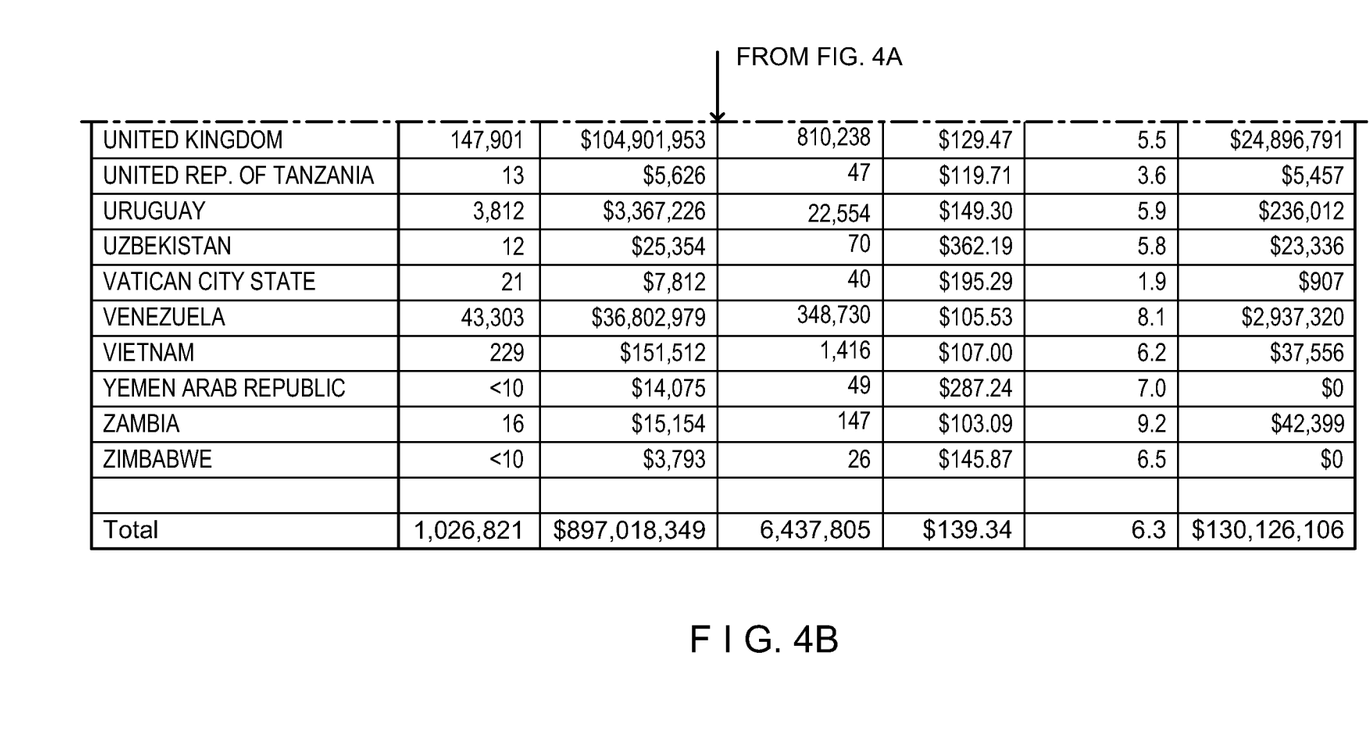

FIG. 4 shows a partial section of an exemplary report 400 according to the method discussed above that shows aggregated spending with foreign-issued credit cards in a locality. In this case, the locality is the state of XYZ. The report 400 shown includes a partial list of the nationalities (originating country) of foreign visitors that have used a credit card within the state of XYZ for the third quarter of 2009. The first column 402 lists the countries of origin of the foreign visitors in alphabetical order. Column 404 lists the total foreign visitor cardholder count and column 406 lists the total amount spent by the foreign visitors from each country. The cardholder count 404 is determined by counting unique instances of account numbers that are present in the filtered transaction database 32. The cardholder count 404 is used by the locality as a proxy for a true visitor count, which is difficult to derive using a transaction file since (1) the file may contain transactions of a certain brand of cards such as Visa and (2) not all foreign visitors use credit cards for withdrawal or purchase.

The report 400 also contains other columns such as transaction count (number of transactions) 408, average ticket amount (average dollar value) 410, transactions per cardholder (total spend amount 406 divided by transaction count 408) 412 and cash amount (total value of cash withdrawn using credit cards at an ATM or bank) 414. At the bottom of the report, the total amount for each column, except columns 410 and 412 which are averages, is shown.

Although the report shown in FIG. 4 has been generated for consumer transactions, a separate report for commercial accounts can also be generated. The method of FIG. 2 can separate consumer accounts and commercial accounts by using, for example, the card product ID field in the transaction record 30. In another embodiment, a report that combines the consumer and commercial accounts may be generated. The report may be generated periodically (e.g., annually, quarterly, monthly, etc.) to provide information regarding foreign visitation or tourism over the corresponding periods (e.g., annual, by quarter, by month, etc.).

The reports of the type shown in FIG. 4 may provide sufficient information for some entities and/or purposes. However, the information does not indicate the types and market segments of credit card purchases made by foreign visitors. Since card transaction data 30 includes merchant segment information such as the merchant category code (MCC) information, reports including this information or more general market segment information may also be generated. Merchant category codes are designed to be fairly specific as to the type of goods and/or services that the merchant supplies. Merchant segments may be broader categories in which each merchant segment may encompass a number of merchant category codes. For example, in the Visa merchant category codes, there are separate MCCs' for pharmacies and physicians, whereas both pharmacies and physicians may fall under the market segment 'Health Care'.

Figure 5A:
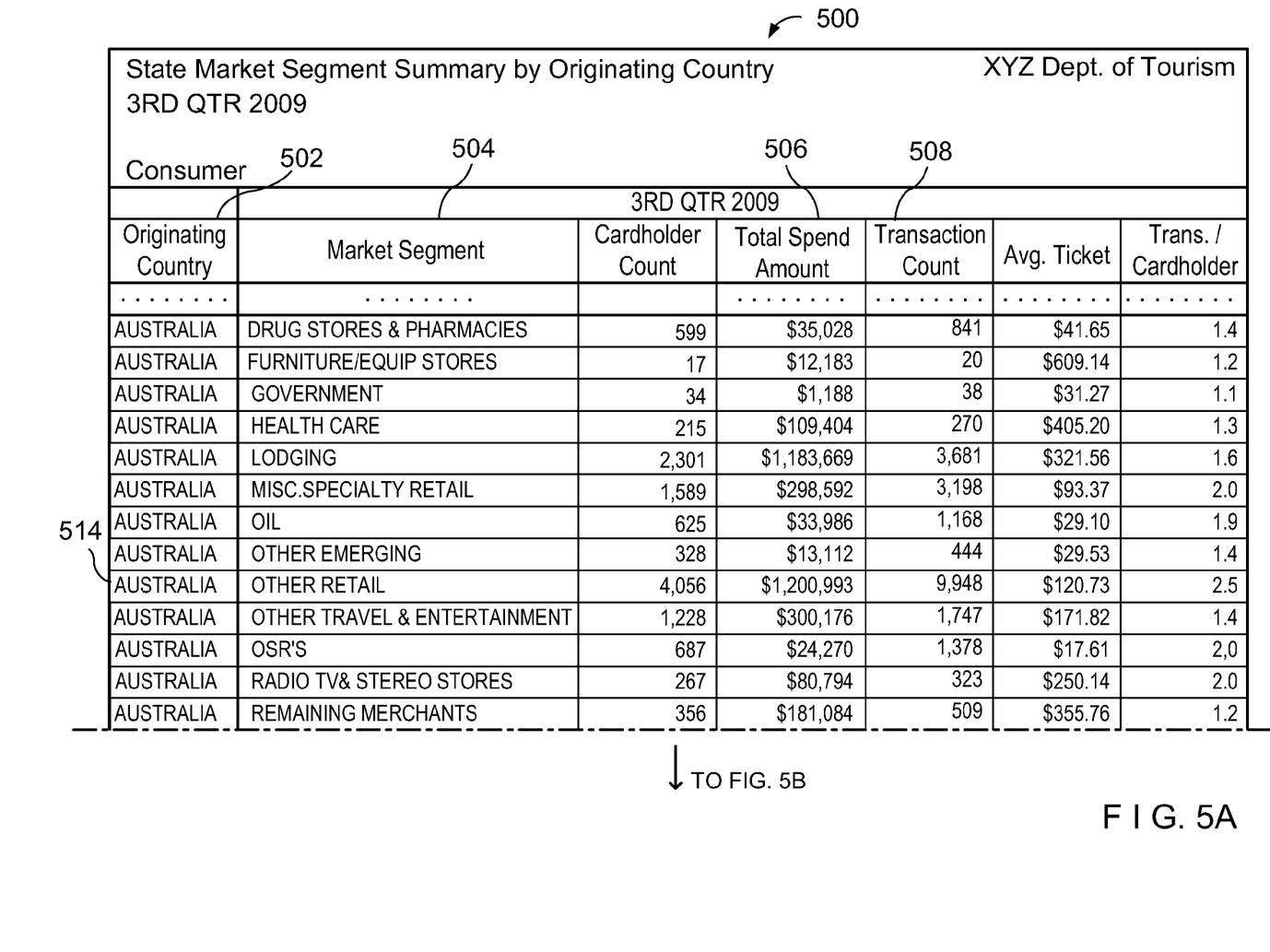
FIG. 5A and FIG. 5B are a portion of another exemplary report showing spending information of foreign visitors organized by market segments according to an embodiment of the present invention.
Figure 5B:
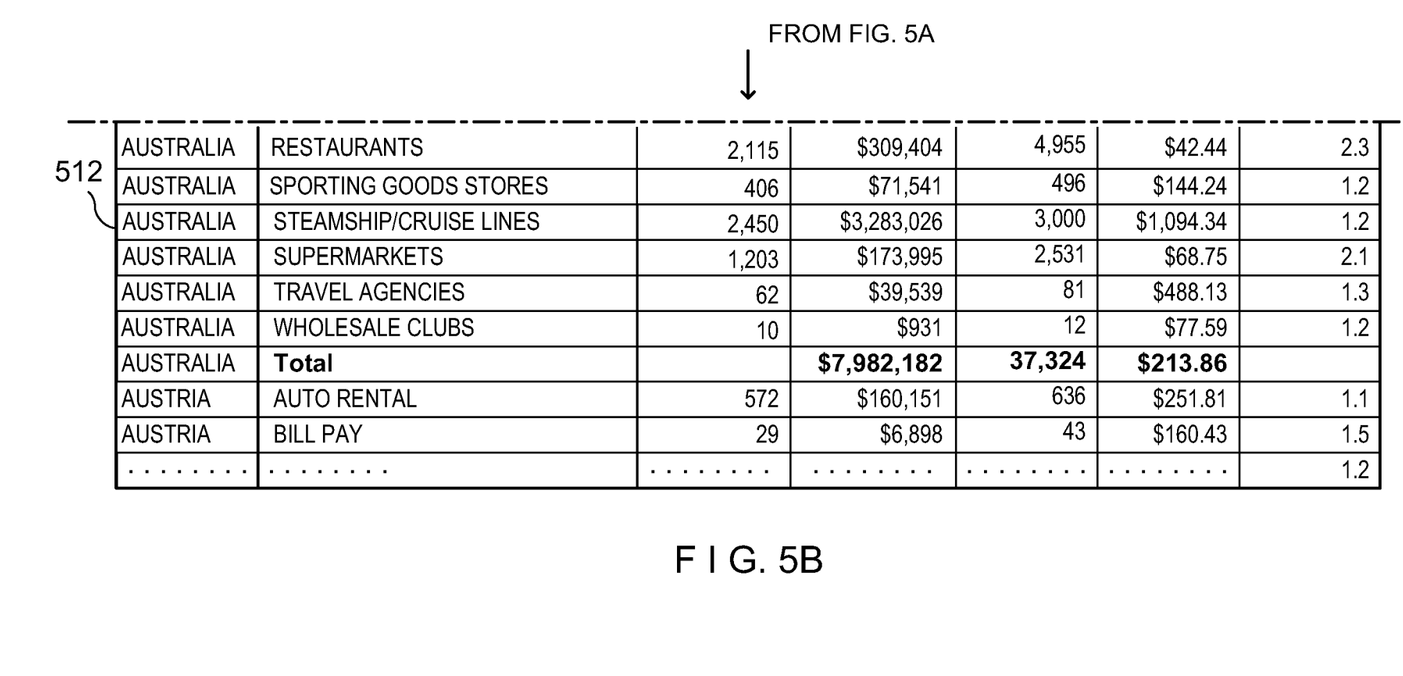

Accordingly, the method generates other types of reports that contain market segment information for credit card purchases made by foreign visitors to a locality. The report 500 as shown in FIG. 5 is one type of such report. It shows the spending of visitors of a particular country in state XYZ for different market segments. The country of origin is listed in column 502, market segment in column 504, total amount spent in column 506 and transaction count in column 508. As may be expected, the report indicates that steamship/cruise lines (shown in row 512) was the largest expenditure category for the foreign visitors, amounting to 3.3 million dollars out of about 8 million dollars spent in total. The category with the next highest expenditure is listed as 'Other Retail' (shown in row 514) which encompasses a wide range of retail stores for which further details are unavailable in this report.

Figure 6A:
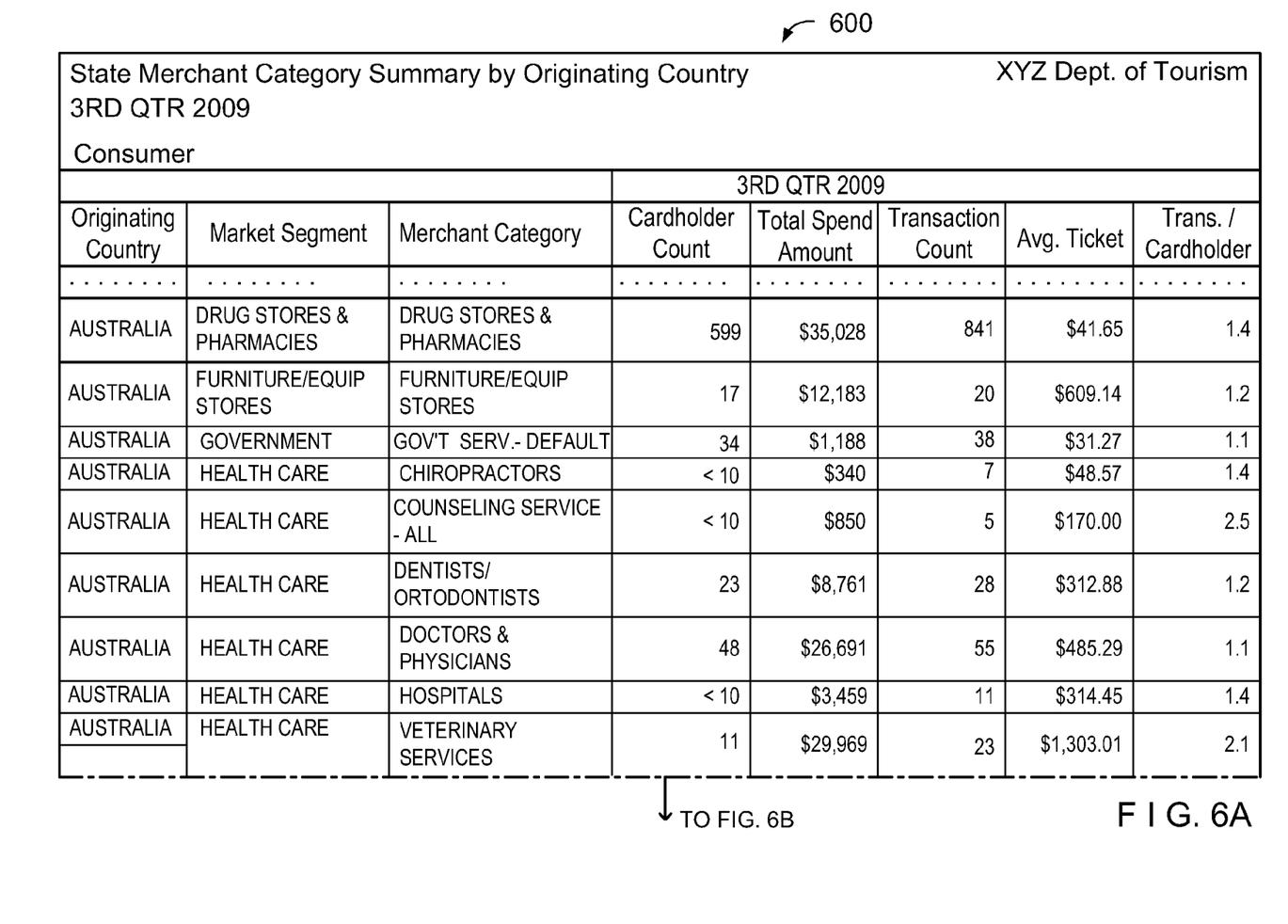
FIG. 6A and FIG. 6B are a portion of another exemplary report showing further detailed spending information of foreign visitors organized by different merchant categories within a merchant segment according to an embodiment of the present invention.
Figure 6B:
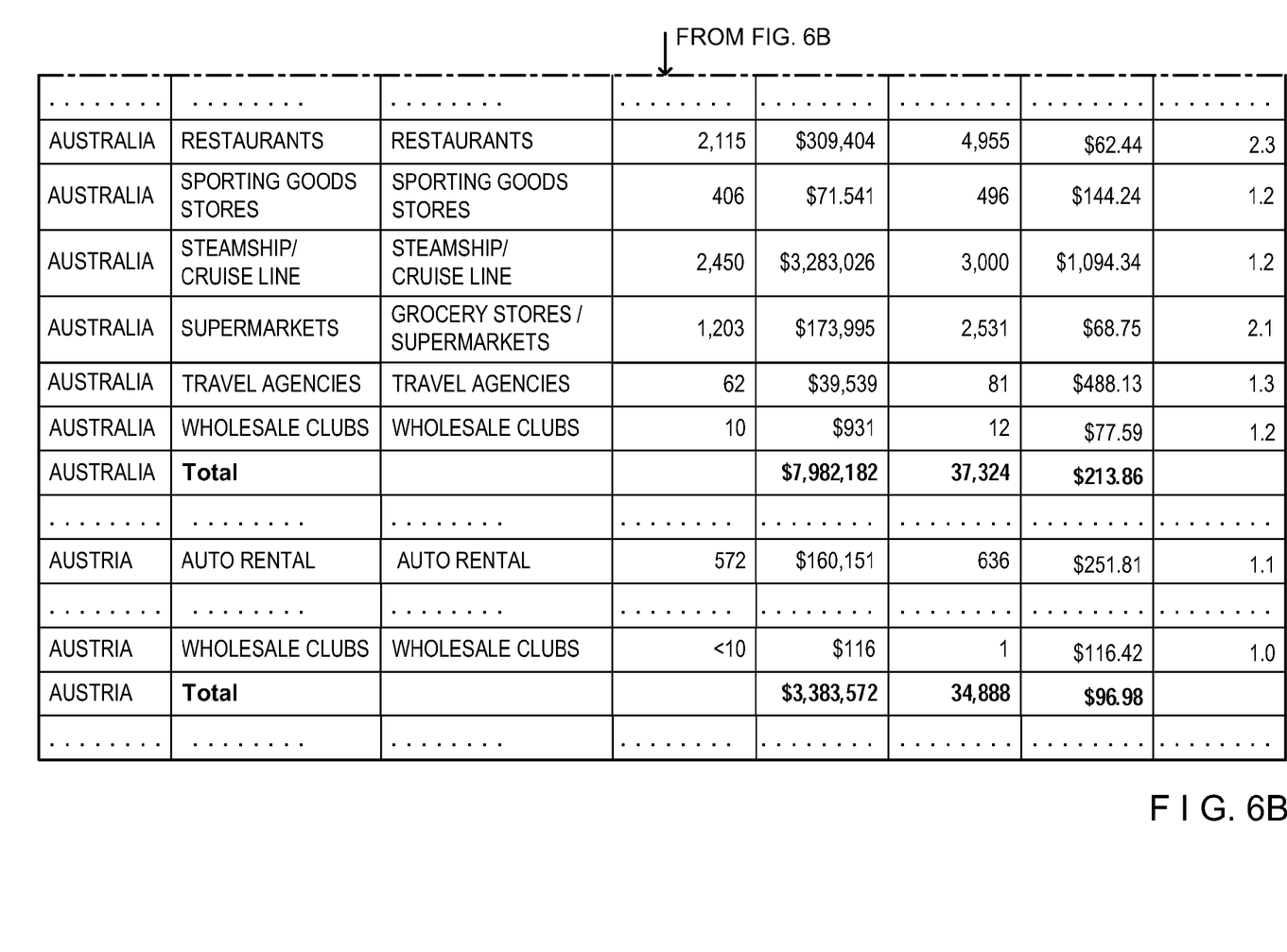

FIG. 6 shows another report 600 which contains further details of spending. Specifically, the report 600 shows the spending of foreign visitors of a particular country in different market segments, which are further broken out to specific merchant categories within each market segment. For each country, the report 600 shows the market segment, a merchant category within the merchant segment, cardholder count, total spending by the cardholders, transaction count, average purchase amount per transaction, and number of transactions per cardholder count. The report 600 contains information that is useful and not necessarily intuitive. For instance, it is not necessarily to be expected that foreign visitors would spent a substantial amount ($29,969) on veterinary services which is more than the amount spent on doctors and physicians ($26,691). This type of information may be useful for the state to determine where to spend its marketing/advertising dollars.

As discussed above, the card transactions are filtered to exclude those that are more likely to have been made by cardholders who are in the locality/state on a long-term basis such as students, expatriate executives, scientists, technical workers, and the like. Additionally, to ensure geographic accuracy, transactions that do not occur at the point of sale, such as e-commerce transactions, and transactions by mail or telephone are also excluded. Consequently, the reports generated are much more accurate than had been possible previously.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for providing spending information in a locality by foreign visitors using transaction records of financial presentation devices (FPDs) that are presentable to merchants, the system comprising:
    a storage device that stores a plurality of records of transactions performed with FPDs issued in foreign regions;
    a processor coupled to the storage device and, upon execution of software instructions by the processor, causes the system at least to:
        generate a filtered set of transaction records that exclude, from the stored records, a set of transactions which are indicative of having been made by long term residents of the locality, wherein the filtered set of transaction records excludes bill-pay transactions associated with payment of recurring bills to at least one service provider servicing the locality; and
        generate, based on the filtered set of transaction records, a spending report containing an aggregated amount of the transactions performed in the locality using the FPDs issued in foreign regions.

2. The system of claim 1, wherein the software instructions, when executed by the processor, cause the system to generate the filtered set of transaction records by:
    determining, from the stored records, a set of transactions which are indicative of having been made by long term residents of the locality; and
    excluding, from the stored records, records of all transactions by the FPDs that performed the determined set of transactions.

3. The system of claim 1, wherein the software instructions, when executed by the processor, cause the system to generate the filtered set of transaction records by:
    determining a merchant type associated with each of the stored records; and
    classifying, based on the determined merchant types, a set of the stored records as the bill-pay transactions.

4. The system of claim 3, wherein the software instructions, when executed by the processor, cause the system to identify transactions whose merchant is a utility service provider or a pay TV service provider.

5. The system of claim 1, wherein the software instructions, when executed by the processor, cause the system to generate the filtered set of transaction records that exclude, from the storage device, records of all mail order, telephone and school transactions.

6. The system of claim 1, wherein the software instructions, when executed by the processor, cause the system to generate the filtered set of transaction records that exclude, from the storage device, records of transactions that are not face-to-face transactions.

7. The system of claim 1, wherein the software instructions, when executed by the processor, cause the system to exclude, from the storage device, records of transactions whose merchant is a school.

8. The system of claim 1, wherein the software instructions, when executed by the processor, cause the system to exclude, from the storage device, records of transactions whose merchant category identifier contained in the transaction record indicates a school.

9. The system of claim 1, wherein the software instructions, when executed by the processor, cause the system to generate the spending report that further includes, for each of the foreign regions, a total number of the holders who have performed the transactions in the locality using the FPDs.

10. The system of claim 1, wherein the locality comprises one of: a state, a region of a state, a metropolitan statistical area (MSA) or a city.

11. The system of claim 1, wherein the locality comprises a state and the foreign regions are either foreign countries or other states.

12. A system for providing spending information in a locality by foreign visitors using transaction records of financial presentation devices (FPDs) that are presentable to merchants, the system comprising:
    a database adapted to store a plurality of records of transactions performed with FPDs issued in foreign regions;
    a processor coupled to the database and, upon execution of software instructions by the processor, causes the system at least to:
        determine bill-pay transactions in the database, wherein the bill-pay transactions are associated with payment of recurring bills to at least one service provider servicing the locality;
        generate a filtered set of transaction records that exclude, from the database, records of all transactions by the FPDs that performed the determined bill-pay transactions; and
        generate, based on the filtered set of transaction records, a spending report containing an aggregated amount of the transactions performed in the locality using the FPDs issued in foreign regions.

13. The system of claim 12, wherein the software instructions, when executed by the processor, cause the system to identify transactions whose merchant is a utility service provider or a pay TV service provider.

14. The system of claim 12, wherein the software instructions, when executed by the processor, cause the system to generate the filtered set of transaction records that exclude, from the database, records of all mail order, telephone and school transactions.

15. The system of claim 12, wherein the software instructions, when executed by the processor, cause the system to generate the filtered set of transaction records that exclude, from the database, records of transactions that are not face-to-face transactions.

16. The system of claim 12, wherein the software instructions, when executed by the processor, cause the system to exclude, from the database, records of transactions whose merchant is a school.

17. The system of claim 12, wherein the software instructions, when executed by the processor, cause the system to exclude, from the database, records of transactions whose merchant category identifier contained in the transaction record indicates a school.

18. The system of claim 12, wherein the software instructions, when executed by the processor, cause the system to generate the spending report that further includes, for each of the foreign regions, a total number of the holders who have performed the transactions in the locality using the FPDs.

19. The system of claim 12, wherein the locality comprises one of: a state, a region of a state, a metropolitan statistical area (MSA) or a city.

20. A method comprising:
determining, from a plurality of records of transactions performed with financial presentation devices (FPDs) issued in foreign regions stored in a storage device, a set of transactions which are indicative of having been made by long term residents of a locality;
generating, by a processor, a filtered set of transaction records that exclude, from the storage device, records of all transactions by the FPDs that performed the determined set of transactions, wherein the filtered set of transaction records excludes bill-pay transactions associated with payment of recurring bills to at least one service provider servicing the locality; and
generating, based on the filtered set of transaction records, a spending report containing an aggregated amount of the transactions performed in the locality using the FPDs issued in foreign regions.

21. The method of claim 20, wherein the step of determining includes determining the set of transactions by identifying bill pay transactions among the stored plurality of records.

22. The method of claim 20, wherein the step of determining includes determining the bill-pay transactions by identifying transactions whose merchant is a utility service provider or a pay TV service provider.

23. The method of claim 20, wherein the step of generating a filtered set of transaction records includes generating the filtered set of transaction records that exclude, from the storage device, records of all mail order, telephone and school transactions.

24. The method of claim 20, wherein the step of generating a filtered set of transaction records includes generating the filtered set of transaction records that exclude, from the storage device, records of transactions that are not face-to-face transactions.

25. The method of claim 20, wherein the step of generating a filtered set of transaction records includes excluding, from the storage device, records of transactions whose merchant is a school.

26. The method of claim 20, wherein the step of generating a filtered set of transaction records includes excluding, from the storage device, records of transactions whose merchant category identifier contained in the transaction record indicates a school.

27. The method of claim 20, wherein the step of generating a spending report includes generating the spending report that further includes, for each of the foreign regions, a total number of holders who have performed the transactions in the locality using the FPDs.

28. The method of claim 20, wherein the transaction analysis module generates the spending report containing an aggregated amount of the transactions for each of the foreign regions of holders who have performed the FPD transactions in the locality of a state, a region of a state, a metropolitan statistical area (MSA) or a city.

29. The method of claim 20, wherein the transaction analysis module generates the spending report containing an aggregated amount of the transactions for each of the foreign regions of holders who have performed the FPD transactions in the locality.

30. A computer-implemented method comprising:
accessing, by a processor, a database storing a plurality of transaction records that include transaction data on purchases made within a predetermined amount of time, wherein each of the transaction records identifies an issuer country code that is based on an issuer bank's identification number, a merchant country code, a transaction amount, a product identifier, a merchant category code, and at least one of an electronic commerce indicator and a mail or telephone order;
processing, by the processor, the transaction records to identify the transaction records:
(1) having the United States of America as the issuer country code,
(2) associated with purchases performed outside of a locality,
(3) associated with any of an online transaction, a mail order transaction, and a telephone transaction,
(4) having a merchant category code identifying any one of a direct marketing merchant, a catalog merchant, and a school, and
(5) indicative of bill-pay transactions associated with payment of recurring bills to at least one service provider servicing the locality,
generating, by the processor, a filtered set of transaction records that excludes the identified transaction records from the filtered set; and
processing, by a processor, the filtered set of transaction records to generate spending data indicating:
(1) a plurality of countries of origin,
(2) a total number of cardholders associated with each of the countries of origin and a total number of foreign cardholders,
(3) a total amount spent by each of the countries of origin and a total amount spent by the foreign cardholders,
(4) an average ticket for each of the countries of origin and an average ticket for the foreign cardholders,
(5) an average number of transactions per cardholder for each of the countries of origin and an average number of transaction by the foreign cardholders, and
(6) a total amount of cash withdrawals by each of the countries of origin and a total amount cash withdrawals by the foreign cardholders; and
generating a spending report based on the spending data.

* * * * *